C. R. FORD.
LUGGAGE RECEPTACLE FOR AUTOMOBILES.
APPLICATION FILED MAR. 29, 1917.
1,277,563.
Patented Sept. 3, 1918.
2 SHEETS—SHEET 1.
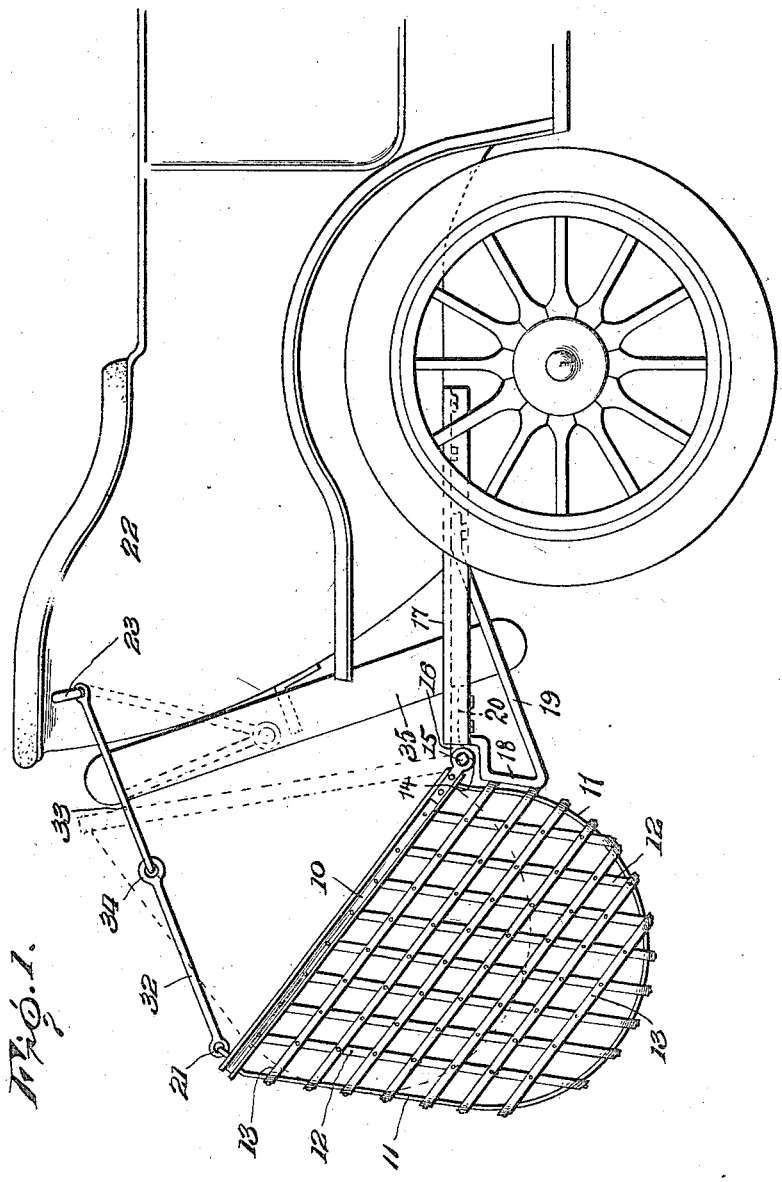
Inventor
C. R. Ford.
Witness
By [signature], Attorneys

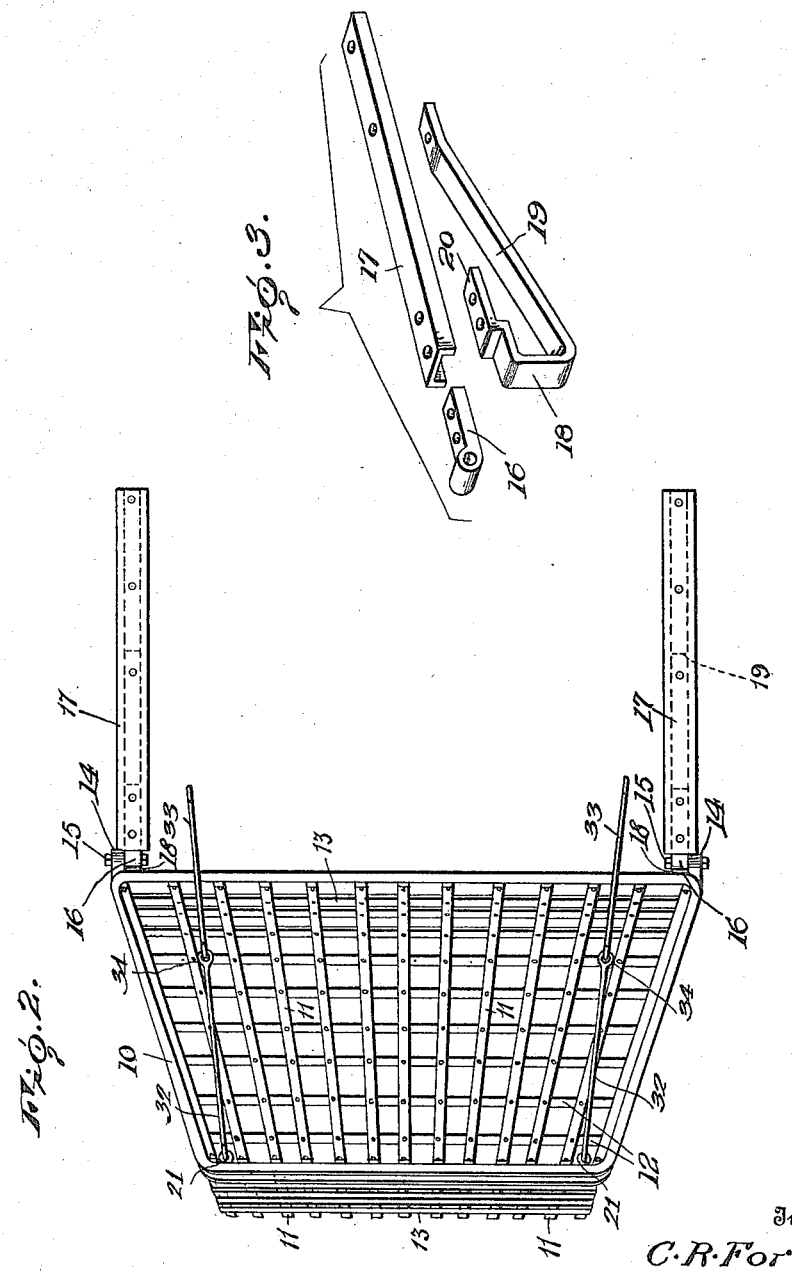

UNITED STATES PATENT OFFICE.

CHARLES R. FORD, OF PADUCAH, KENTUCKY.

LUGGAGE-RECEPTACLE FOR AUTOMOBILES.

1,277,563.  Specification of Letters Patent.  Patented Sept. 3, 1918.

Application filed March 29, 1917. Serial No. 158,387.

*To all whom it may concern:*

Be it known that I, CHARLES R. FORD, a citizen of the United States, residing at Paducah, in the county of McCracken and State of Kentucky, have invented certain new and useful Improvements in Luggage-Receptacles for Automobiles, of which the following is a specification.

This invention relates to carrier devices adapted to be detachably and adjustably connected to a vehicle, more particularly to automobiles, and like vehicles, and has for one of its objects to provide a receptacle, preferably basket like in form and adapted to be quickly attached to the rear of the vehicle, foldable in close engagement therewith when loaded, and adapted to be lowered to position to enable the load to be deposited in the carrier or removed therefrom.

Another object of the invention is to provide a device of this character which may be readily adapted without material structural change to automobiles and like vehicles of various constructions and sizes.

With these and other objects in view, the invention consists in certain novel features of construction, as hereinafter shown and described and then specifically pointed out in the claim; and in the drawings illustrative of the preferred embodiment of the invention—

Figure 1 is a side elevation of the rear portion of an automobile with the device applied;

Fig. 2 is a detached plan view of the improved device;

Fig. 3 represents one of the bracket devices with its parts separated, and including the body portion, one of the hinged members, and one of the combined braces and stops.

Corresponding and like parts are referred to in the following description and indicated in all the views of the drawings by the same reference characters.

The improved device comprises a receptacle formed of a rim member 10, preferably oblong in outline and of less length at one side than the other, as illustrated in Fig. 2. The rim or band 10 may be constructed of any required material, but is preferably formed from an endless bar of channel shape transversely. The frame 10 forms a support for a plurality of strips of flat metal arranged in spaced relation and designated by the characters 11—12. The strips are bent into U-shape and connected at their upturned ends respectively to the sides and ends of the frame 10, and cross each other substantially at right angles and are riveted together at their crossing points, as shown in Fig. 2. The strips 11—12 are riveted at their terminals to the members of the frame 10 as shown. A third set of strips extends around the strips 11—12 and is disposed in spaced parallel relation and in parallel relation to the frame 10, the latter set of strips being indicated at 13. The three sets of strips 11—12—13 when riveted together as shown in Figs. 1 and 2 constitute a basket like receptacle.

Attached to the frame member 10 at the end of its longer side are hinge members 14 which are coupled by detachable pintles 15 to coacting hinge members 16. The hinge members 16 are riveted or otherwise rigidly secured to bracket devices 17, the latter preferably constructed from sections of channel bars as illustrated in Fig. 3. The members 17 are designed to extend beneath the frame of an automobile at the rear and project rearwardly of the same. The members 17 thus hingedly support the basket, as shown.

Attached to each of the bracket devices 17 is a combined brace and stop, each constructed from a single bar of metal and comprising a vertical portion 18 and an obliquely directed portion 19. The vertical portion 18 of each brace member is off set to extend as shown at 20 beneath the hinge member 16 and is preferably bolted or riveted thereto by the same bolts or rivets which hold the hinge member to the bracket member. At its inner end the obliquely directed portion 19 of the stop and brace is riveted fast to the member 17. The vertical portion 18 of the brace member is designed to be engaged by the adjacent portion of the basket like receptacle and thus effectually limit the downward movement of the receptacle, as illustrated in Fig. 1. The combined brace and stop member thus bears largely the strain of the weight of the receptacle and its contents. Swingingly united at 21 to the frame 10 at the side opposite to the hinges, is a rod 32, and adapted to be swingingly united to the body portion 22 of the automobile is another rod 33, the two rods being swingingly coupled at their adjacent ends as shown at 34. The rod 33 will preferably be formed with an eye to engage over the rearward top prop device one of which is represented conventionally at 23. By this arrangement the member 32—33 being swingingly coupled to each other and likewise swingingly coupled respectively to the body 22 of the automobile and the frame 10 support the frame and its basket attachment from downward displacement, and form combined braces and hangers, while at the same time the rods 32—33 will fold downwardly to permit the receptacle including the member 10 and the basket like structure to be folded into the position shown in dotted lines in Fig. 1, thus providing for folding the improved attachment with its open side relatively close to the rear of the automobile or the extra tire represented at 35 which is usually carried at the rear of an automobile. The basket-like carrier may thus be supported upon the automobile without interfering with the extra tire. If the extra tire is not carried at the rear of the automobile, the bracket device 17 may be attached to the frame of the automobile with their hinge members 16 nearer the body of the automobile, so that the basket will fold into a smaller space, or in closer relation to the body of the automobile. When not required the device can be removed by simply detaching the pintles 15 and releasing the rod 33 from engagement with the top prop member 23. It is now to be noted, as particularly shown in Fig. 2 of the drawings, that the basket is formed with an inner narrow side wall and an outer wide side wall or, in other words, the basket is deeper adjacent its outer side than it is adjacent its inner side. The rim of the basket is consequently inclined transversely of the basket and since the said basket is swingingly connected adjacent its upper inner edge to the brackets 17, the stops at the outer ends of the said brackets will thus normally support the basket in position with the said rim inclining upwardly and outwardly from the brackets. It will be seen that this construction provides an arrangement whereby the outer wide side wall of the basket will tend to prevent articles from becoming accidentally displaced from within the basket during the starting or stopping of the vehicle or while the vehicle is in motion. Furthermore, surreptitious access to the basket will be rendered more difficult since the open top of the basket will normally confront the rear end of the vehicle.

The improved device is simple in construction, can be inexpensively manufactured and applied without material structural change to various forms and makes of automobiles and like vehicles, and will be found very convenient in transporting articles from place to place, or employed for the transportation of traveler's luggage and for like purposes.

Having thus described the invention, what is claimed as new is:

A carrier attachment of the class described comprising brackets adapted to be attached to a vehicle, a hinge member carried by each bracket, a rigid stop depending from each bracket below the hinge member and including upper and lower vertical portions joined by an offset extending beneath the adjacent hinge member to project rearwardly therefrom, and a bracing portion extending forwardly from the lower end of the latter vertical portion, an open top rigid receptacle having hinge members extending from its front top edge and coupled to the hinge members of the brackets, the receptacle bearing when lowered against the stops, and a lower vertical portions attached to the rear top bracing support attached to the rear top edge of the receptacle and adapted to detachably engage the body of a vehicle.

In testimony whereof I affix my signature.

CHARLES R. FORD.

Copies of this patent may be obtained for five cents each, by addressing the "Commissioner of Patents, Washington, D. C."